US008595177B1

(12) United States Patent
Nelson et al.

(10) Patent No.: US 8,595,177 B1
(45) Date of Patent: Nov. 26, 2013

(54) RISK MANAGEMENT FOR OBJECT IDENTIFICATION

(75) Inventors: Kenric P. Nelson, Hollis, NH (US); Brian J. Scannell, Cambridge, MA (US); Herbert Landau, Alexandria, VA (US)

(73) Assignee: Raytheon Company, Waltham, MA (US)

( * ) Notice: Subject to any disclaimer, the term of this patent is extended or adjusted under 35 U.S.C. 154(b) by 351 days.

(21) Appl. No.: 13/042,699

(22) Filed: Mar. 8, 2011

(51) Int. Cl.
*G06F 9/44* (2006.01)
(52) U.S. Cl.
USPC ............................................................ 706/52
(58) Field of Classification Search
None
See application file for complete search history.

(56) References Cited

U.S. PATENT DOCUMENTS

| | | |
|---|---|---|
| 5,202,661 A | 4/1993 | Everett, Jr. et al. |
| 5,341,142 A | 8/1994 | Reis et al. |
| 6,897,802 B1 | 5/2005 | Daniell et al. |
| 6,909,997 B2 | 6/2005 | Chen et al. |
| 7,006,869 B2 | 2/2006 | Bradley |
| 7,065,465 B2 | 6/2006 | Chen et al. |
| 7,079,023 B2 | 7/2006 | Haller |
| 7,099,796 B2 | 8/2006 | Hamza |
| 7,576,681 B2 | 8/2009 | Chen et al. |
| 7,719,461 B1 | 5/2010 | Mookerjee et al. |
| 2010/0070238 A1 | 3/2010 | Phelps et al. |

OTHER PUBLICATIONS

Cremer et al., "A Comparison of Decision-Level Sensor-Fusion Methods for Anti-Personnel Landmine Detection", Sep. 2001, Information Fusion, vol. 2 Issue 3, pp. 187-208.*
Tilmann Gneiting and Adrian E. Raftery; Strictly Proper Scoring Rules, Prediction, and Estimation; Journal of the American Statistical Association; Mar. 2007; vol. 102, No. 477; pp. 359-378.
Alfred O. Hero, Bing MA, Olivier Michel and John Gorman; Alpha-Divergence for Classification, Indexing and Retrieval; Communications and Signal Processing Laboratory Technical Report CSPL-328; May 2001 (revised Dec. 2002); 25 pages.
Josef Kittler, Mohamad Hatef, Robert P.W. Duin and Jiri Matas; On Combining Classifiers; IEEE Transactions on Pattern Analysis and Machine Intelligence; Mar. 1998; vol. 20, No. 3; pp. 226-239.
Jane O'Brien; Correlated Probability Fusion for Multiple Class Discrimination; Defence Evaluation and Research Agency; 1999; 6 pages.
Robi Polikar; Ensemble Based Systems in Decision Making; IEEE Circuits and Systems Magazine; Third Quarter 2006; pp. 21-45.

(Continued)

*Primary Examiner* — Jeffrey A Gaffin
*Assistant Examiner* — Paulinho E Smith
(74) *Attorney, Agent, or Firm* — Pierce Atwood LLP; Joseph M. Maraia

(57) ABSTRACT

The technology described herein includes a system and/or a method of risk management for object identification. The method includes selecting at least two fusion functions from a plurality of fusion functions. Each of the fusion functions is associated with a different risk bias. The method further includes fusing a received set of data based on each fusion function to form at least two sets of fused data. The method further includes generating a probability of identification of the classification of the object based on each set of the fused data. The method further includes determining a risk bias difference between the probability of identification of each set of the fused data.

14 Claims, 5 Drawing Sheets

(56) References Cited

OTHER PUBLICATIONS

Hiroki Suyari and Makoto Tsukada; Law of Error in Tsallis Statistics; IEEE Transactions on Information Theory; Feb. 2005; vol. 51, No. 2; pp. 753-757.

David M.J. Tax, Martijn Van Breukelen, Robert P.W. Duin and Josef Kittler; Combining Multiple Classifiers by Averaging or by Multiplying?; Pattern Recognition; 2000; vol. 33; pp. 1475-1485.

Ludmila I. Kuncheva; Combining Pattern Classifiers Methods and Algorithms; 2004; pp. 151-188.

Kenric P. Nelson and Sabir Umarov; Nonlinear Statistical Coupling; Physica A; www.elsevier.com/locate/physa; Feb. 8, 2010; vol. 389; pp. 2157-2163.

Constantineo Tsallis; Nonadditive entropy and nonextensive statistical mechanics—an overview after 20 years; Brazilian Journal of Physics; Aug. 2009; vol. 39; No. 2A, pp. 337-356.

Brian Scannell, Kenric P. Nelson, Caitlin McCann and Nora Tgavalekos; Fusion Algorithm to Quantify the Uncertainty in Multi-Look Discrimination; Oct. 9, 2009; Abstract for presentation.

\* cited by examiner

RISK MANAGEMENT FOR OBJECT IDENTIFICATION

BACKGROUND

Object identification is the process of taking radar measurements and creating a vector of probabilities that the object being tracked is a known object type. Prior attempts at object identification focused on ensuring that the largest probability would be assigned to the actual classification of the object as often as possible which generally resulted in overconfident behavior. As such, uncertainty in identification results was not represented within the classifications of the objects. Thus, a need exists in the art for improved risk management for object identification.

SUMMARY

One approach provides a system for risk management for object identification. The system includes a fusion function selection module configured to select at least two fusion functions from a plurality of fusion functions. Each of the fusion functions is associated with a different risk bias. The system further includes a data fusion module configured to fuse a received set of data based on each fusion function to form at least two sets of fused data. The system further includes a probability of identification module configured to generate a probability of identification of a classification of the object based on each set of the fused data. The system further includes a risk bias determination module configured to determine a risk bias difference between the probability of identification of each set of the fused data.

Another approach provides a method for risk management for object identification. The method includes selecting at least two fusion functions from a plurality of fusion functions, each of the fusion functions associated with a different risk bias; fusing a received set of data based on each fusion function to form at least two sets of fused data; generating a probability of identification of the classification of the object based on each set of the fused data; and determining a risk bias difference between the probability of identification of each set of the fused data.

Another approach provides a computer program product for risk management for object identification. The computer program product is tangibly embodied in an information carrier. The computer program product includes instructions being operable to cause a data processing apparatus to select at least two fusion functions from a plurality of fusion functions, each of the fusion functions associated with a different risk bias; fuse a received set of data based on each fusion function to form at least two sets of fused data; generate a probability of identification of the classification of the object based on each set of the fused data; and determine a risk bias difference between the probability of identification of each set of the fused data.

In other examples, any of the approaches above can include one or more of the following features.

In some examples, the system further includes a fusion function generation module configured to generate the plurality of fusion functions based on a base fusion function and one or more parameters.

In other examples, the one or more parameters include at least two sets of alpha and beta parameter pairs. In some examples, the system further includes a parameter module configured to determine the least two sets of alpha and beta parameter pairs. Each alpha parameter is associated with a fusion function. Each beta parameter is associated with a degree of expected independence of a received set of data. The received set of data includes information associated with the classification of the object.

In other examples, a first fusion function is associated with a decisive or robust risk bias and a second fusion function is associated with a neutral risk bias.

In some examples, the fusion function selection module further configured to determine the decisive risk bias, the neutral risk bias, and the robust risk bias based on probabilities of one or more training samples.

In other examples, the parameter module is further configured to define the associations between classifications of the object based on a generalized mean between the probabilities of the one or more training samples.

In some examples, the decisive risk bias is associated with a higher confidence of identification of the classification of the object, the neutral risk bias is associated with a non-biased confidence of identification of the classification of the object, and the robust risk bias is associated with a lower confidence of identification of the classification of the object.

In other examples, the method further includes generating the plurality of fusion functions based on a base fusion function and one or more parameters.

In some examples, each of the fusion functions in the plurality of fusion functions is different.

In other examples, the method further includes optimizing the risk bias associated with each of the fusion functions based on a risk profile associated with one or more training samples.

In some examples, the probability of identification for each set of fused data is indicative of the identified object being a target object.

In other examples, the received set of data comprising radar signal data.

The risk management for object identification techniques described herein can provide one or more of the following advantages. An advantage of the technology is that the probability of accurate object identification is bound by a confidence interval which accounts for different levels of risk (also referred to as risk bias), thereby increasing the confidence level of the object identification and reducing the risk associated with the object identification. Another advantage of the technology is the different levels of risk are related by non-linear statistical coupling which models the degree of confidence of the identification, thereby optimizing the management of the risk of the object identification via the risk bias difference between the different levels of risk.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

The risk management for object identification method and apparatus includes technology that, generally, accounts and/ or manages risk in decision and inference techniques for object identification. The technology utilizes a generalized information theoretic metric to account for influence of risk and confidence in formulating a posterior probability and making a maximum likelihood decision. The technology advantageously enables improved decisions by providing more informative output via multiple probability outputs.

The technology utilizes a degree of nonlinear statistical coupling between classes defined by the probability. The nonlinear coupling can be used to model the degree of negative risk or optimism (e.g., with a value of zero representing risk neutrality, with a predefined value representing a known risk, etc.). The technology can utilize different fusion functions (e.g., different techniques, different parameters, etc.) to optimize the probability output with different levels of risk (e.g., decisive probability, accurate probability, robust probability). In this example, the decisive and robust probabilities provide confidence bounds on the accurate probability. The different risk bias can be utilized to design decision logic which accounts for risk levels (e.g., via a training sample, via a test set, etc.).

The technology can be utilized for resource allocation (e.g., human resource, electronic resource, physical resource, military resource, medical resources, etc.) and/or planning (e.g., financial accounts, military planning, etc.) by improving the identification of the state of the object (also referred to as the object classification). The state of the object can be any type of classification (e.g., physical object classification, image classification, medical classification, state of nature classification, stock price classification, financial classification, electronic classification, etc.). For example, for optical character recognition, additional processing resources can be allocated to the characters and/or words with the largest risk bias difference to confirm the identification of the characters and/or words. As another example, for airplane tracking, tracking resources can be allocated to the airplanes with the smallest risk bias difference of being a threat to allocate defensive/offensive resources to track/intercept the airplanes.

In some examples, the technology can transmit the object identification to control units. The control units can allocate sensor and/or weapon resources and/or make shoot/no-shoot decisions based on the identifications and/or risk bias difference. For example, the technology can be utilized for target object maps to assist exoatmospheric kill vehicles in on-board decisions for disabling a threat (e.g., probability of an object being a threat, probability of an object being a decoy, etc.).

Figure 1:
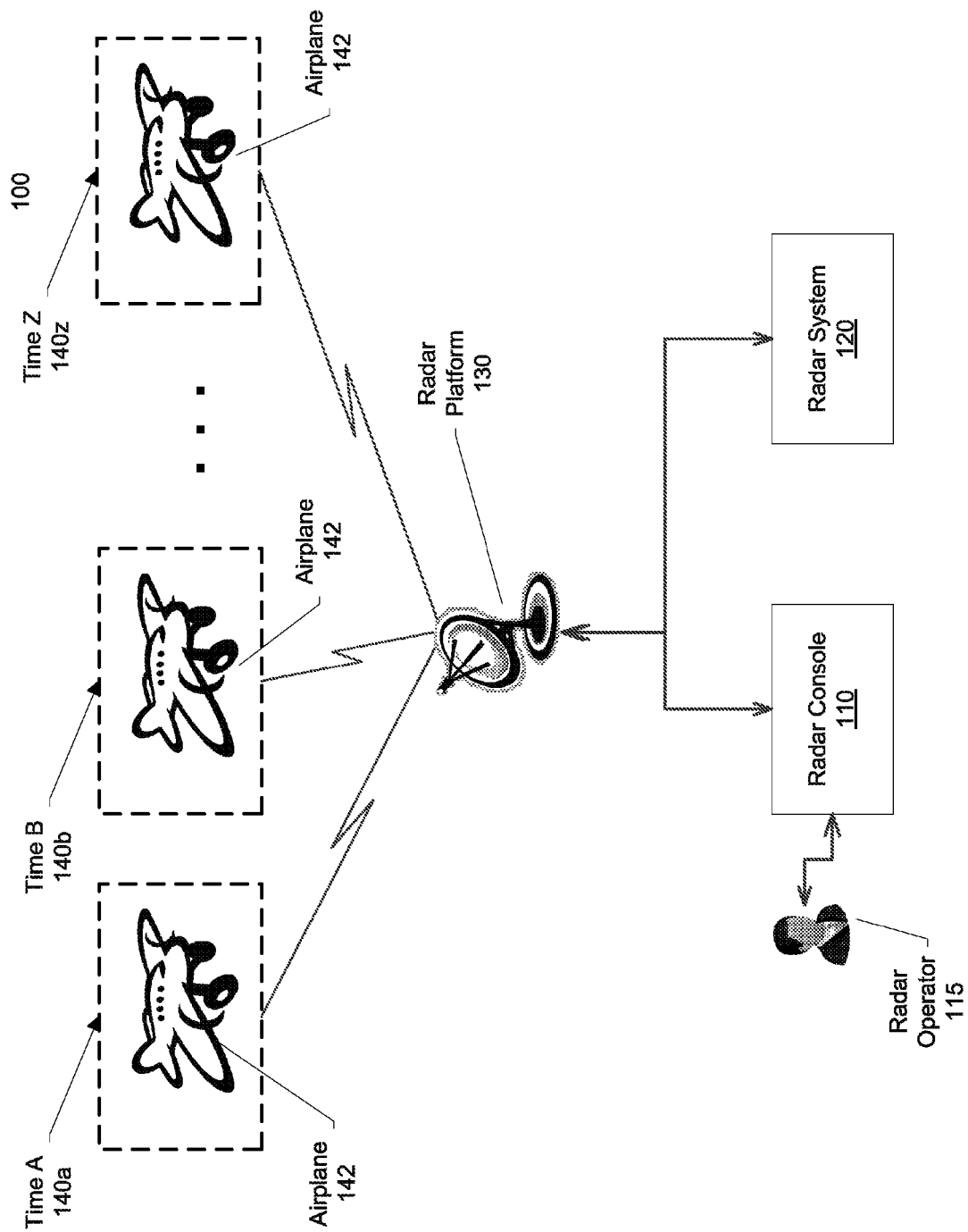
FIG. 1 is a diagram of an exemplary radar environment.

FIG. 1 is a diagram of an exemplary radar environment 100. The environment 100 includes a radar console 110, a radar system 120, and a radar platform 130. A radar operator 115 views and/or tracks an object (in this example, an airplane 142) utilizing the radar console 110. The radar system 120 tracks the airplane 142 at a plurality of times A 140a, B 140b through Z 140z. The radar platform 130 transmits and/or receives electromagnetic waves to track the object and/or a plurality of other objects (not shown). For example, the radar platform 130 transmits electromagnetic waves over a period of time and receives the reflection of the electromagnetic waves from the airplane 142 over the plurality of times A 140a, B 140b through Z 140z. The radar platform 130 communicates data (e.g., digital representation of a radar reflection of the airplane 142, processed data representation of the airplane 142, etc.) to the radar system 120.

The radar system 120 analyzes part or all of the received data to manage the risk of object identification. The management of the risk includes determining a risk bias difference between the probabilities of identification for sets of data fused by at least two fusion functions, thereby advantageously increasing the confidence of object identification and maximizing resource allocation. The utilization of different fusion functions enables the technology to measure how much risk is associated with the object identification by smoothing out differences between overly optimistic probabilities (robust), neutral probabilities, and/or pessimistic probabilities (decisive). Table 1 illustrates exemplary risk biases. Table 2 illustrates exemplary fusion functions.

TABLE 1

Exemplary Risk Biases

| Risk Bias | Confidence | Scale (0-10) |
| --- | --- | --- |
| Highly Decisive | Highest Confidence of Identification | 0.0 |
| Decisive | Higher Confidence of Identification | 2.5 |
| Neutral/Accurate/Non-bias | Non-biased Confidence of Identification | 5.0 |
| Robust | Lower Confidence of Identification | 7.5 |
| Highly Robust | Lowest Confidence of Identification | 10.0 |

TABLE 2

Exemplary Fusion Functions

| Technique | Parameters | Confidence |
| --- | --- | --- |
| Averaging | NA | Robust |
| Log-Averaging | NA | Neutral |
| Multiplying | NA | Decisive |
| Alpha-beta | Alpha ($\alpha$) = 0.0; Beta ($\beta$) = 1.0 | Decisive |
| Alpha-beta | Alpha ($\alpha$) = 0.0; Beta ($\beta$) = 0.0 | Neutral |
| Alpha-beta | Alpha ($\alpha$) = 1.0; Beta ($\beta$) = 0.0 | Robust |
| $\kappa$-product | $\kappa$ = 0 | Neutral |
| $\kappa$-product | $\kappa$ = −1 | Robust |
| $\kappa$-product | $\kappa$ = 2 | Decisive |

Although FIG. 1 illustrates the plurality of times A 140a, B 140b through Z 140z, the radar system 120 can utilize received data from any number of times for the identification of objects. Although FIG. 1 illustrates a radar platform 130, the environment 100 can utilize any number of radar platforms (e.g., ten radar platforms, one hundred radar platforms, etc.). For example, the radar system 120 can receive radar data from any number of radar platforms for the same object or different objects. In other examples, the radar platform 130 can include a plurality of radars and/or other types of sensor devices (e.g., motion sensor, environmental sensor, heat sensor, etc.).

Figure 2:
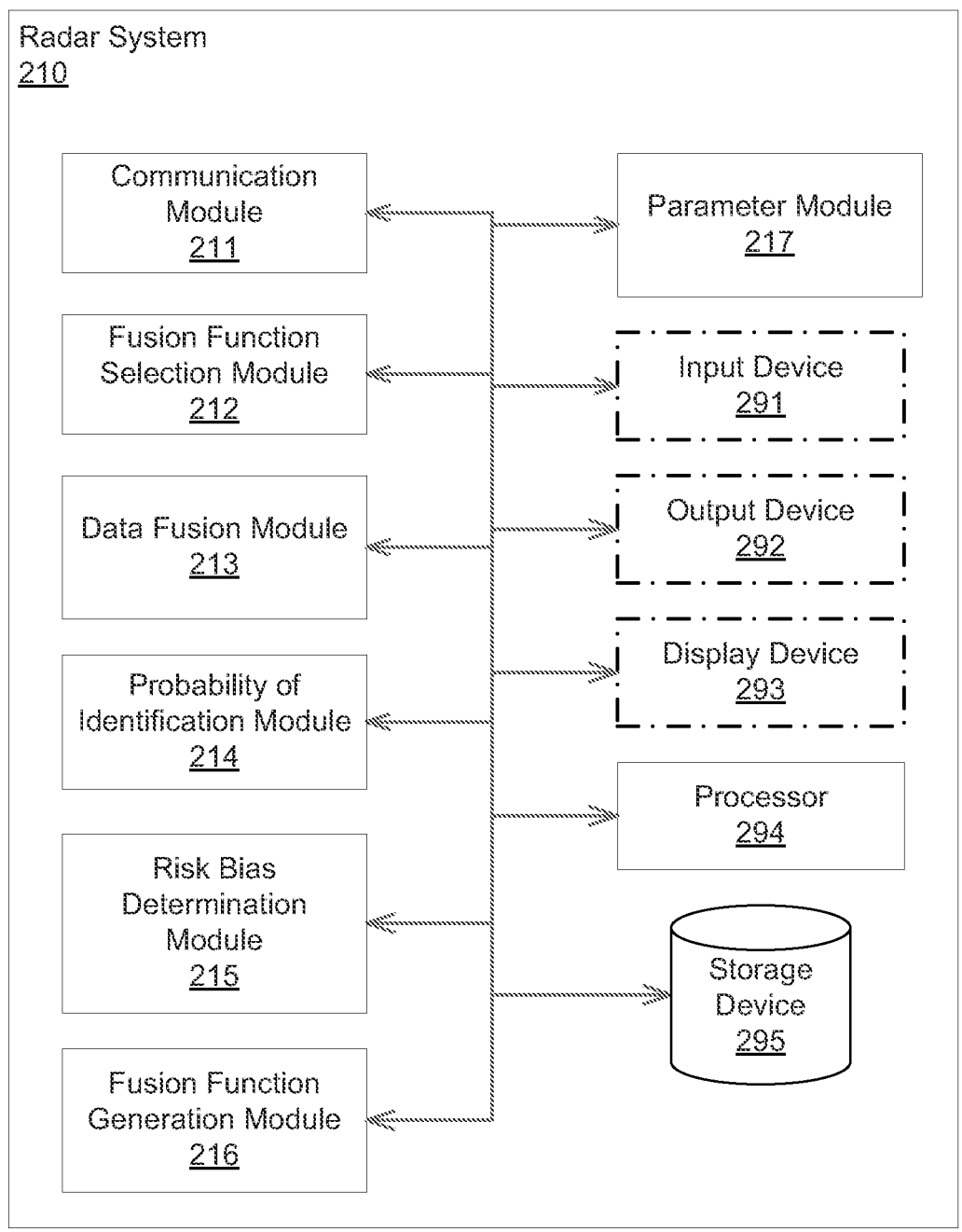
FIG. 2 is a block diagram of an exemplary radar system.

FIG. 2 is a block diagram of an exemplary radar system 210. The radar system 210 includes a communication module 211, an fusion function selection module 212, a data fusion module 213, a probability of identification module 214, a risk bias determination module 215, a fusion function generation module 216, a parameter module 217, an input device 291, an output device 292, a display device 293, a processor 294, and a storage device 295. The modules and devices described herein can, for example, utilize the processor 294 to execute computer executable instructions and/or include a processor to execute computer executable instructions (e.g., an encryption processing unit, a field programmable gate array processing unit, etc.). It should be understood that the radar system 210 can include, for example, other modules, devices, and/or processors known in the art and/or varieties of the illustrated modules, devices, and/or processors.

The communication module 211 receives the radar data (e.g., radar signal data, from a radar platform, from an intermediate radar processing device, from a storage device, etc.). The communication module 211 communicates information to/from the radar system 210. The communication module 211 can receive, for example, information associated with a radar platform. The information associated with the radar platform can be associated with a data signal (e.g., data signal from a radar platform, processed data signal from a radar platform, data signal from a motion sensor, data signal from a global positioning system, data signal from a location system, etc.).

The fusion function selection module 212 select at least two fusion functions from a plurality of fusion functions. Each of the fusion functions is associated with a different risk bias (e.g., decisive, neutral, etc.). In some examples, the fusion function selection module 212 determines the decisive risk bias, the neutral risk bias, and the robust risk bias based on probabilities of one or more training samples (e.g., stored training samples, real-time training samples, etc.).

The data fusion module 213 fuses a received set of data based on each fusion function to form at least two sets of fused data. The probability of identification module 214 generates a probability of identification of a classification of the object based on each set of the fused data. The risk bias determination module 215 determines a risk bias difference between the probability of identification of each set of the fused data. The fusion function generation module 216 generates the plurality of fusion functions based on a base fusion function and one or more parameters (e.g., alpha-beta fusion function and a first set of parameters, alpha-beta fusion function and a second set of parameters, etc.). In some examples, the one or more parameters includes at least two sets of alpha and beta parameter pairs.

The parameter module 217 determines at least two sets of alpha and beta parameter pairs. Each alpha parameter is associated with a fusion function. Each beta parameter is associated with a degree of expected independence of a received set of data. The received set of data includes information associated with the classification of the object.

In other examples, the parameter module 217 defines the associations between classifications of the object based on a generalized mean between the probabilities of the one or more training samples. In other examples, a first fusion function is associated with a decisive or robust risk bias and a second fusion function is associated with a neutral risk bias.

In some examples, the decisive risk bias is associated with a higher confidence of identification of the classification of the object, the neutral risk bias is associated with a non-biased confidence of identification of the classification of the object, and the robust risk bias is associated with a lower confidence of identification of the classification of the object. The utilization of the decisive risk bias, the neutral risk bias, and the robust risk bias advantageously enables the technology to measure the distance between these biases to determine the risk of the neutral risk bias. For example, a large distance between the biases can indicate disagreement between the input references of the object identification. As another example, a small distance between the biases can indicate agreement between the input references of the object identification. Tables 3-4 illustrate exemplary risk bias differences.

TABLE 3

Exemplary Risk Bias Differences

| Technique | Confidence | Probability of Identification | Risk Bias Difference |
|---|---|---|---|
| Averaging | Robust | 75% | 10% |
| Log-Averaging | Neutral | 85% | NA |
| Multiplying | Decisive | 97% | 12% |

TABLE 4

Exemplary Risk Bias Differences

| Technique | Confidence | Probability of Identification | Risk Bias Difference |
|---|---|---|---|
| Alpha-beta; Alpha ($\alpha$) = 0.0; Beta ($\beta$) = 1.0 | Decisive | 99% | 27% |
| Alpha-beta; Alpha ($\alpha$) = 0.0; Beta ($\beta$) = 0.0 | Neutral | 72% | NA |
| Alpha-beta; Alpha ($\alpha$) = 1.0; Beta ($\beta$) = 0.0 | Robust | 63% | 9% |

In other examples, the risk bias determination module 215 determines a risk bias difference between the probability of identification of each set of the fused data and utilizes the risk bias difference to determine neutral probability of identification. For example, as illustrated in Table 5, the risk bias determination module 215 averages the risk bias difference of the decisive risk bias and the robust risk bias to determine the probability of identification (in this example, 85%).

TABLE 5

Exemplary Risk Bias Differences

| Technique | Confidence | Probability of Identification |
|---|---|---|
| Alpha-beta; Alpha ($\alpha$) = 0.0; Beta ($\beta$) = 1.0 | Decisive | 100% |
| Alpha-beta; Alpha ($\alpha$) = 1.0; Beta ($\beta$) = 0.0 | Robust | 70% |

The input device 291 receives information associated with the radar system 210 (e.g., instructions from a user, instructions from another computing device, etc.) from a user (not shown) and/or another computing system (not shown). The input device 291 can include, for example, a keyboard, a scanner, etc. The output device 292 outputs information associated with the radar system 210 (e.g., information to a printer (not shown), information to a speaker, etc.).

The display device 293 displays information associated with the radar system 210 (e.g., status information, configuration information, etc.). In some examples, the display device 293 displays the probability of identification of the classification of the object and/or any other information associated with the radar system 210 to an operator. The processor 294 executes the operating system and/or any other computer executable instructions for the radar system 210 (e.g., executes applications, etc.).

The storage device 295 stores the received data (e.g., actual radar data, processed radar data, etc.), the identifications, and/or any other data associated with the radar system 210. The storage device 295 can store image information and/or any other data associated with the radar system 210. The storage device 295 can include a plurality of storage devices and/or the radar system 210 can include a plurality of storage devices (e.g., a radar storage device, an identification storage device, etc.). The storage device 295 can include, for example, long-term storage (e.g., a hard drive, a tape storage device, flash memory, etc.), short-term storage (e.g., a random access memory, a graphics memory, etc.), and/or any other type of computer readable storage.

Figure 3:
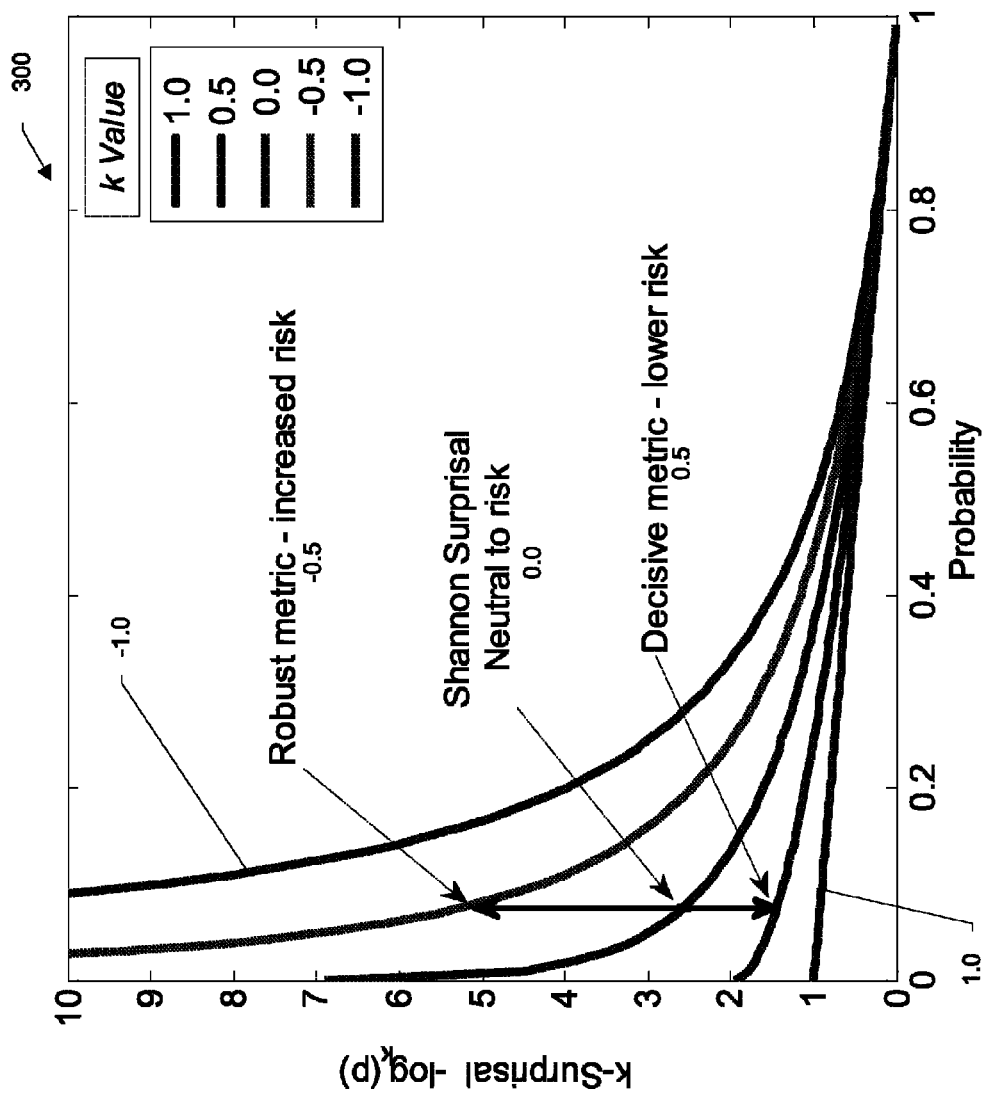
FIG. 3 illustrates a diagram of information cost function with different risk biases.
Figure 4:
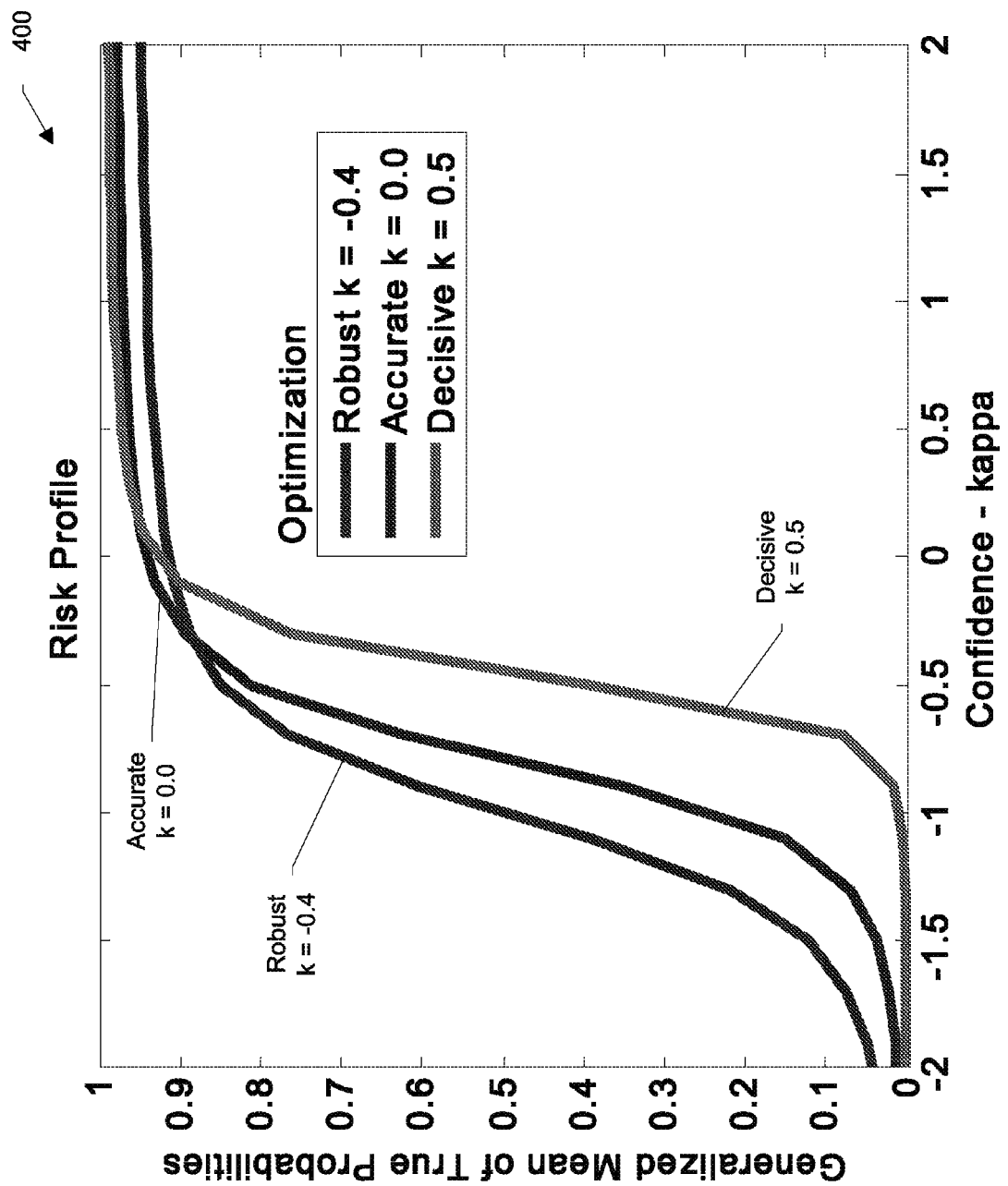
FIG. 4 illustrates a diagram of a performance of the risk management techniques.

FIG. 3 illustrates a diagram 300 of the information cost functions with different risk biases. The diagram 300 illustrates the coupled-Surprisal as the information cost function for a given posterior probability of a true event. As illustrated in FIG. 3, the k value is the confidence or negative risk. For κ>0, the cost function stays finite and favors algorithms which are decisive (confident); for κ=0, the cost function is equivalent to Shannon surprisal and is neutral; and for κ<0, the cost function goes to infinity faster and favors algorithms which are robust (cautious). The average coupled-Surprisal can be translated to back to a probability utilizing the inverse of the coupled-Surprisal described herein and the result of the translation is the generalized mean of probabilities FIG. 4 illustrates a diagram 400 of a performance of the risk management techniques. The diagram 400 illustrates the comparison of three fusion algorithms optimized for risk biases of κ=−0.4 (robust), κ=0 (neutral), κ=0.5 (decisive). The diagram 400 illustrates the generalized mean of the true event probabilities as the confidence (negative risk) bias varies from κ=−2 to κ=2. The decisive algorithm is optimal for large values of kappa, but degrades quickly for negative values of kappa. The neutral algorithm is optimal for κ=0 and degrades in performance for negative kappa values more gradually. The robust algorithm degrades in performance more slowly and is optimal for small values of kappa.

Figure 5:
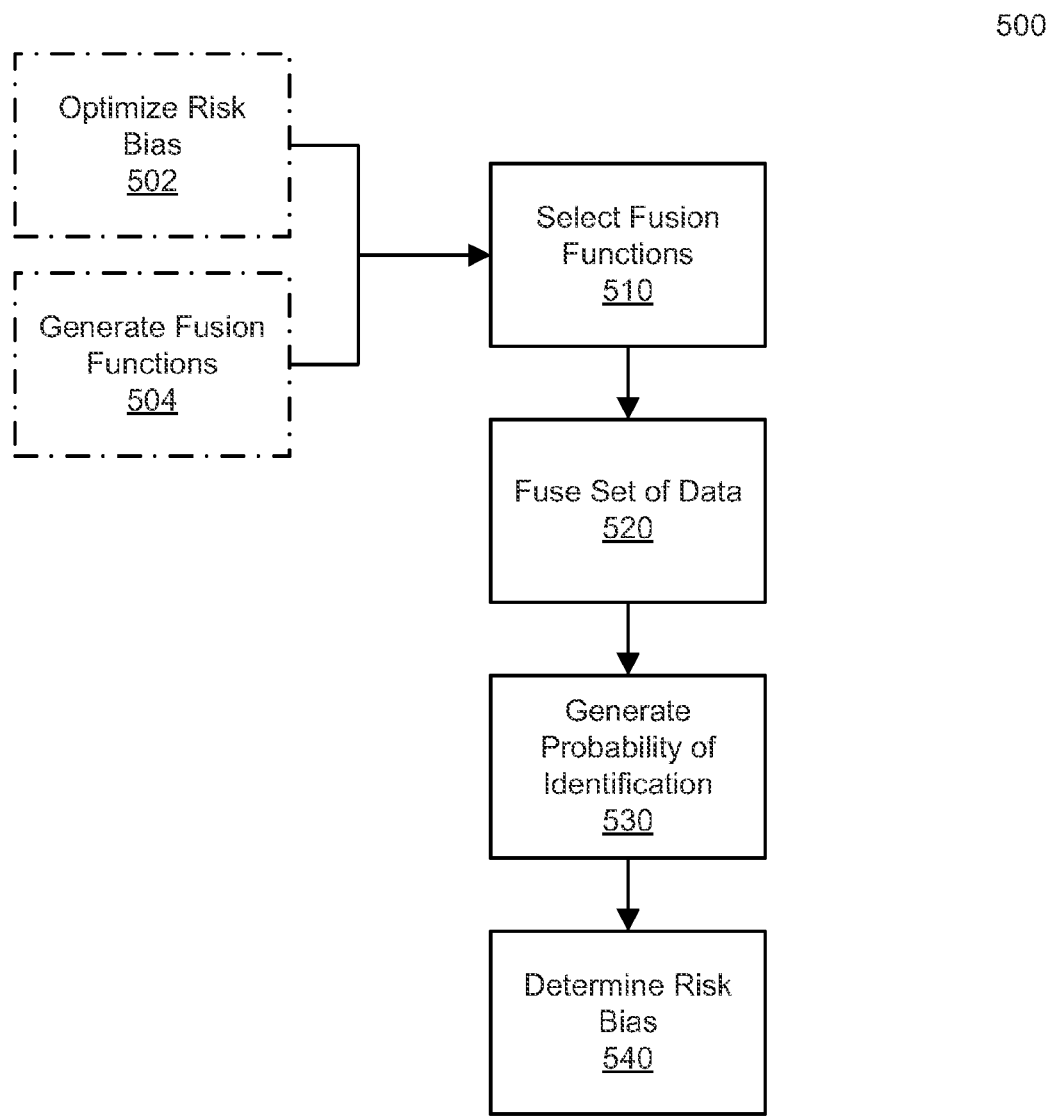
FIG. 5 is a flowchart of an exemplary radar process.

FIG. 5 is a flowchart of an exemplary radar process 500 utilizing, for example, the radar system 120 of FIG. 1. The radar system 120 selects (510) at least two fusion functions from a plurality of fusion functions. Each of the fusion functions is associated with a different risk bias. The radar system 120 fuses (520) a received set of data based on each fusion function to form at least two sets of fused data. The radar system 120 generates (530) a probability of identification of the classification of the object based on each set of the fused data. The radar system 120 determines (540) a risk bias difference between the probability of identification of each set of the fused data.

In some examples, the radar system 120 optimizes (502) the risk bias associated with each of the fusion functions based on a risk profile associated with one or more training samples. In other examples, the radar system 120 generates (504) the plurality of fusion functions based on a base fusion function and one or more parameters.

In some examples, each of the fusion functions in the plurality of fusion functions is different. In other examples, the probability of identification for each set of fused data is indicative of the identified object being a target object. In some examples, the received set of data includes radar signal data. Table 6 illustrates exemplary identification and probabilities.

TABLE 6

Exemplary Identification and Probabilities

| Confidence | Identification | Probability of Identification |
| --- | --- | --- |
| Decisive | Missile Type TR4E | 99% |
| Neutral | Missile Type TR4E | 85% |
| Robust | Missile Type TR4E | 83% |

In other examples, the fusion functions are determined using a configuration process (also referred to as a training process). The configuration process can use a large set of training data for a test of the technology. The training data can be utilized to determine the optimal values. The training data can be, for example, collected from a true object and/or created based on a model of a true object.

For example, various simulations utilizing a plurality of static values for the fusion functions for each data input in the training data. In this example, for each of these possible technology configurations (i.e., each fusion function), the technology is analyzed against metrics (e.g., Shannon Surprisal, Brier score, etc.) to determine the optimal set of the fusion functions for the technology configuration.

In some examples, the fusion function is calculated in accordance with equation: If any $|\alpha_i|<TOL$ $$\text{If } \sum_{j=1}^{N} w_j < 1$$

$$W_i = 1$$

else $$W_i = \left[\sum_{j=1}^{N} w_j\right]^{\beta_i - 1}$$

$$P(\omega_i | x_1, x_2, \ldots, x_N) = \frac{P(\omega_i)\left(\prod_{j=1}^{N} P(\omega_i | x_j)^{w_j}\right)^{W_i}}{\sum_{k=1}^{C}\left[P(\omega_k)\left(\prod_{j=1}^{N} P(\omega_i | x_j)^{w_j}\right)^{W_k}\right]}$$

else $$V = \sum_{j=1}^{N} w_j$$

$$\text{If } \sum_{j=1}^{N} w_j < 1$$

$$W_i = V$$

else $$W_i = V^{\beta_i}$$

$$P(\omega_i | x_1, x_2, \ldots, x_N) = \frac{P(\omega_i)\left(\frac{1}{V}\sum_{j=1}^{N} w_j P(\omega_i | x_j)^{\alpha_i}\right)^{\frac{W_i}{\alpha_i}}}{\sum_{k=1}^{C}\left[P(\omega_k)\left(\frac{1}{V}\sum_{j=1}^{N} w_j P(\omega_k | x_j)^{\alpha_k}\right)^{\frac{W_k}{\alpha_k}}\right]}$$

whereas
- $x_i$=Individual classifier execution to be combined
- $P(\omega_i)$=Prior probability of the $i^{th}$ class
- $P(\omega_i|x_j)$=Posterior probability of the $i^{th}$ class for the $j^{th}$ classifier execution, created without the use of prior probabilities
- $P(\omega_i|x_1,\ldots,X_N)$=Posterior probability of the $i^{th}$ class after fusing classifier executions 1 through N
- N=Number of classifier executions
- C=Number of object classes
- $\alpha_i, \beta_i$=Input parameters that determine the type of combining, specified per class
- $w_j$=Weight associated with the $j^{th}$ classifier execution, default value=1
- TOL=tolerance In some examples, the fusion function is calculated in accordance with equation:

$$P(\omega_i | x_1, x_2, \ldots, x_N) = \frac{P(\omega_i)\left(\sum_{j=1}^{N} w_j P(\omega_i | x_j)^\alpha\right)^{\frac{W}{\alpha}}}{\sum_{k=1}^{C}\left[P(\omega_k)\left(\sum_{j=1}^{N} w_j P(\omega_k | x_j)^\alpha\right)^{\frac{W}{\alpha}}\right]}$$

whereas
- $x_i$=Individual classifier execution to be combined
- $P(\omega_i)$=Prior probability of the $i^{th}$ class
- $P(\omega_i|X_j)$=Posterior probability of the $i^{th}$ class for the $j^{th}$ classifier execution, created without the use of prior probabilities
- $P(\omega_i|x_1,\ldots,X_N)$=Posterior probability of the $i^{th}$ class after fusing classifier executions 1 through N
- N=Number of classifier executions
- $W_j$=Weight associated with the $j^{th}$ classifier execution, default value=1

The above-described systems and methods can be implemented in digital electronic circuitry, in computer hardware, firmware, and/or software. The implementation can be as a computer program product. The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can be operatively coupled to receive data from and/or transfer data to one or more mass storage devices for storing data (e.g., magnetic, magneto-optical disks, or optical disks).

Data transmission and instructions can also occur over a communications network. Computer program products suitable for embodying computer program instructions and data include all forms of non-volatile memory, including by way of example semiconductor memory devices. The computer program products can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A system for risk management for object identification, the system comprising:
    one or more processors;
    a fusion function selection module, using the one or more processors, configured to select at least two fusion functions from a plurality of fusion functions, each of the fusion functions associated with a different risk bias;
    a data fusion module, using the one or more processors, configured to fuse a received set of data based on each fusion function to form at least two sets of fused data;
    a probability of identification module, using the one or more processors, configured to generate a probability of identification of a classification of the object based on each set of the fused data; and
    a risk bias determination module, using the one or more processors, configured to determine a risk bias difference between the probability of identification of each set of the fused data, wherein the risk bias difference is a confidence interval which accounts for different levels of risk corresponding to the probability of identification of the classification of the object.

2. The system of claim 1, further comprising a fusion function generation module, using the one or more processors, configured to generate the plurality of fusion functions based on a base fusion function and one or more parameters.

3. The system of claim 2, wherein the one or more parameters comprises at least two sets of alpha and beta parameter pairs, and
    the system further comprising a parameter module configured to determine the least two sets of alpha and beta parameter pairs, each alpha parameter associated with a fusion function, each beta parameter associated with a degree of expected independence of a received set of data, and the received set of data comprising information associated with the classification of the object.

4. The system of claim 1, wherein a first fusion function is associated with a decisive or robust risk bias and a second fusion function is associated with a neutral risk bias.

5. The system of claim 4, wherein the fusion function selection module, using the one or more processors, is further configured to determine the decisive risk bias, the neutral risk bias, and the robust risk bias based on probabilities of one or more training samples.

6. The system of claim 5, wherein the parameter module, using the one or more processors, is further configured to define the associations between classifications of the object based on a generalized mean between the probabilities of the one or more training samples.

7. The system of claim 5, wherein the decisive risk bias is associated with a higher confidence of identification of the classification of the object, the neutral risk bias is associated with a non-biased confidence of identification of the classification of the object, and the robust risk bias is associated with a lower confidence of identification of the classification of the object.

8. A method for risk management for object identification, the method comprising:
    selecting at least two fusion functions from a plurality of fusion functions, each of the fusion functions associated with a different risk bias;
    fusing a received set of data based on each fusion function to form at least two sets of fused data;
    generating a probability of identification of the classification of the object based on each set of the fused data; and
    determining a risk bias difference between the probability of identification of each set of the fused data, wherein the risk bias difference is a confidence interval which accounts for different levels of risk corresponding to the probability of identification of the classification of the object.

9. The method of claim 8, further comprising generating the plurality of fusion functions based on a base fusion function and one or more parameters.

10. The method of claim 8, wherein each of the fusion functions in the plurality of fusion functions is different.

11. The method of claim 8, further comprising optimizing the risk bias associated with each of the fusion functions based on a risk profile associated with one or more training samples.

12. The method of claim 8, wherein the probability of identification for each set of fused data is indicative of the identified object being a target object.

13. The method of claim 8, wherein the received set of data comprising radar signal data.

14. A non-transitory computer program product, tangibly embodied in an information carrier, the computer program product including instructions being operable to cause a data processing apparatus to:
    select at least two fusion functions from a plurality of fusion functions, each of the fusion functions associated with a different risk bias;
    fuse a received set of data based on each fusion function to form at least two sets of fused data;
    generate a probability of identification of the classification of the object based on each set of the fused data; and
    determine a risk bias difference between the probability of identification of each set of the fused data, wherein the risk bias difference is a confidence interval which accounts for different levels of risk corresponding to the probability of identification of the classification of the object.

* * * * *